United States Patent
Chen

(10) Patent No.: US 6,619,829 B1
(45) Date of Patent: Sep. 16, 2003

(54) LIGHTING DEVICE FOR VEHICLE

(76) Inventor: Shih Ling Chen, 5F, No. 17, Lane 37, Yong Kang Street, Taipei (TW)

( * ) Notice: Subject to any disclaimer, the term of this patent is extended or adjusted under 35 U.S.C. 154(b) by 0 days.

(21) Appl. No.: 10/287,645

(22) Filed: Nov. 5, 2002

(51) Int. Cl.⁷ .................................................. B60Q 1/00
(52) U.S. Cl. ....................... 362/544; 362/236; 362/242; 362/244
(58) Field of Search ................................. 362/236, 249, 362/252, 543, 544, 548, 242, 244

(56) References Cited

U.S. PATENT DOCUMENTS

| | | | | |
|---|---|---|---|---|
| 3,759,084 A | * | 9/1973 | Plewka | 362/249 |
| 4,249,234 A | * | 2/1981 | Park et al. | 362/228 |
| 4,949,226 A | * | 8/1990 | Makita et al. | 362/544 |
| 6,193,400 B1 | * | 2/2001 | Schuster et al. | 362/538 |
| 6,471,368 B1 | * | 10/2002 | Lin | 362/216 |

* cited by examiner

*Primary Examiner*—Thomas M. Sember
(74) *Attorney, Agent, or Firm*—Rosenberg, Klein & Lee

(57) ABSTRACT

A lighting device for vehicle includes a base defining an interior space therein and having an open end. The base forms a circumferential groove in and around the open end. A hole is defined in a bottom wall of the groove. A light-transmitting cover has a corrugated flange received in the groove of the base for attaching the cover to the open end of the base for covering the open end. A recess is defined in the flange and substantially aligned with the hole. A plurality of projections is formed on an inside surface of the cover and spaced along an inner circumference of the cover. A primary lighting element, such as a conventional automobile headlight bulb, is fixed in the interior space of the base for projecting a light beam through the cover. A secondary lighting element, such as color light emitting diode (LED), is received in the recess of the cover through the hole of the base whereby light emitted from the secondary lighting element is guided to the projections and projected outward therefrom to form a ring of lighting around the primary lighting element for enhancing the lighting effect of the primary lighting element and also providing effects of alarming, decoration and identification.

6 Claims, 3 Drawing Sheets

LIGHTING DEVICE FOR VEHICLE

BACKGROUND OF THE INVENTION

1. Field of the Invention

The present invention generally relates to a lighting device for vehicles, such as a headlight, a brake light, a turn signal light and a side-marker lamp of an automobile, and in particular to a lighting device providing additional functions of alarming, decoration and identification.

2. The Related Art

Lighting devices are mounted in a vehicle, such as an automobile and a motorcycle, for lighting and indication purposes. For example, a headlight of an automobile projects a head light beam in front of the automobile to light the road environments in front of the automobile for driving safety. However, the lighting devices of automobiles are just of one function. In other words, the lighting devices that are conventionally mounted in automobiles each have only a single function, such as lighting, indication and alarm. No additional function is included in the conventional lighting devices.

In addition, the conventional lighting devices of automobiles do not allow the drivers of other vehicles to identify the vehicles of the same group if a number of vehicle are grouped together in traveling. Unable to identify other members of the group at a far distance makes the vehicles of the group not able to stay together in a long journey.

Thus, it desired to have a lighting device for vehicles to overcome such problems.

SUMMARY OF THE INVENTION

An object of the present invention is to provide a lighting device for vehicles for enhancing lighting effect of the vehicles.

Another object of the present invention is to provide a lighting device for vehicles that, in addition to lighting, provides functions of alarming and decoration.

A further object of the present invention is to provide a lighting device comprising, besides a primary lighting element, a secondary lighting element for providing functions of alarming, decoration and identification.

To achieve the above objects, in accordance with the present invention, there is provided a lighting device comprising a base defining an interior space therein and having an open end. The base forms a circumferential groove in and around the open end. A hole is defined in a bottom wall of the groove. A light-transmitting cover has a corrugated flange received in the groove of the base for attaching the cover to the open end of the base for covering the open end. A recess is defined in the flange and substantially aligned with the hole. A plurality of projections is formed on an inside surface of the cover and spaced along an inner circumference of the cover. A primary lighting element, such as a conventional automobile headlight bulb, is fixed in the interior space of the base for projecting a light beam through the cover. A secondary lighting element, such as color light emitting diode (LED), is received in the recess of the cover through the hole of the base whereby light emitted from the secondary lighting element is guided to the projections and projected outward therefrom to form a ring of lighting around the primary lighting element for enhancing the lighting effect of the primary lighting element and also providing effects of alarming, decoration and identification.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
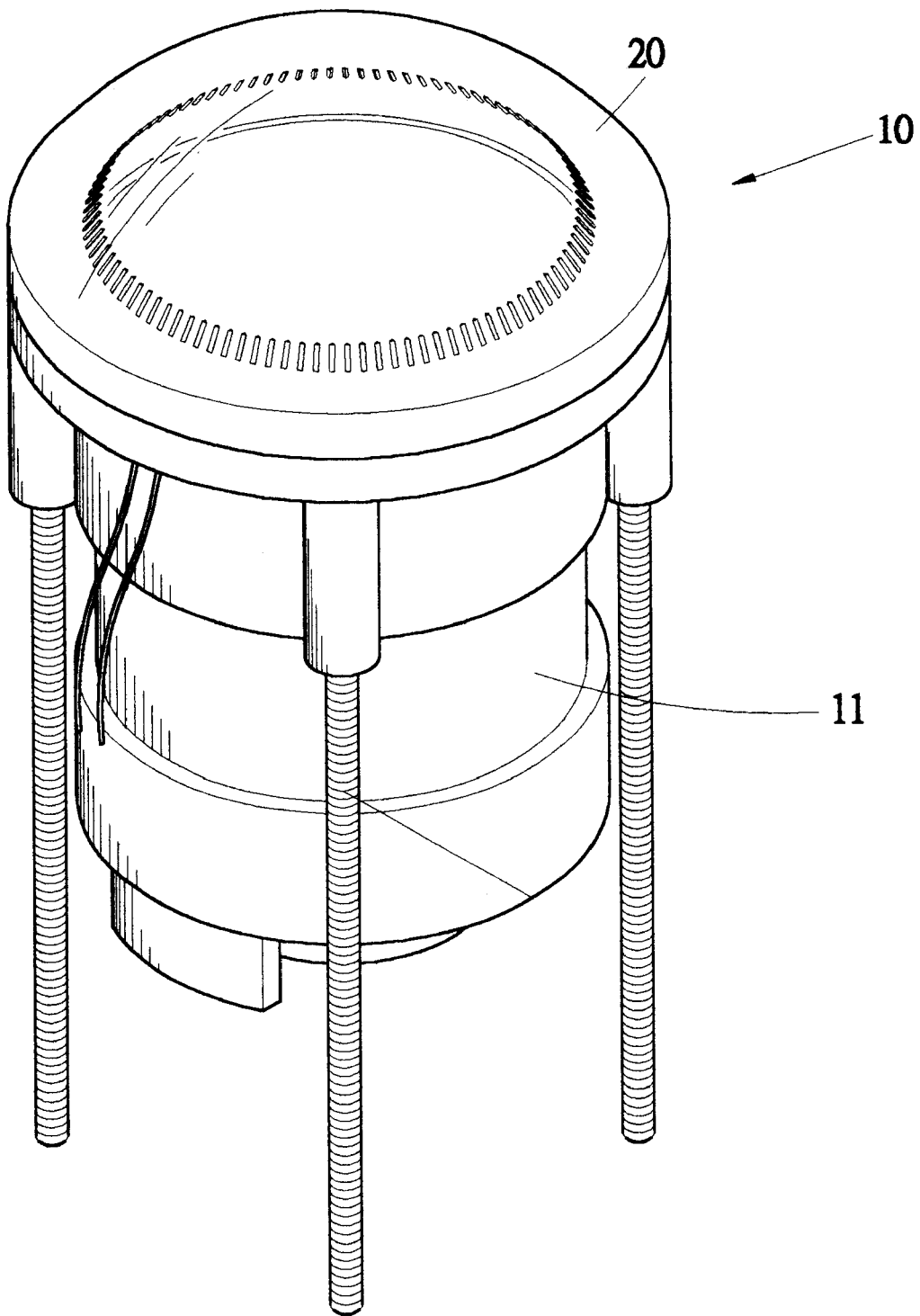
FIG. 1 is a perspective view of a lighting device constructed in accordance with the present invention.
Figure 2:
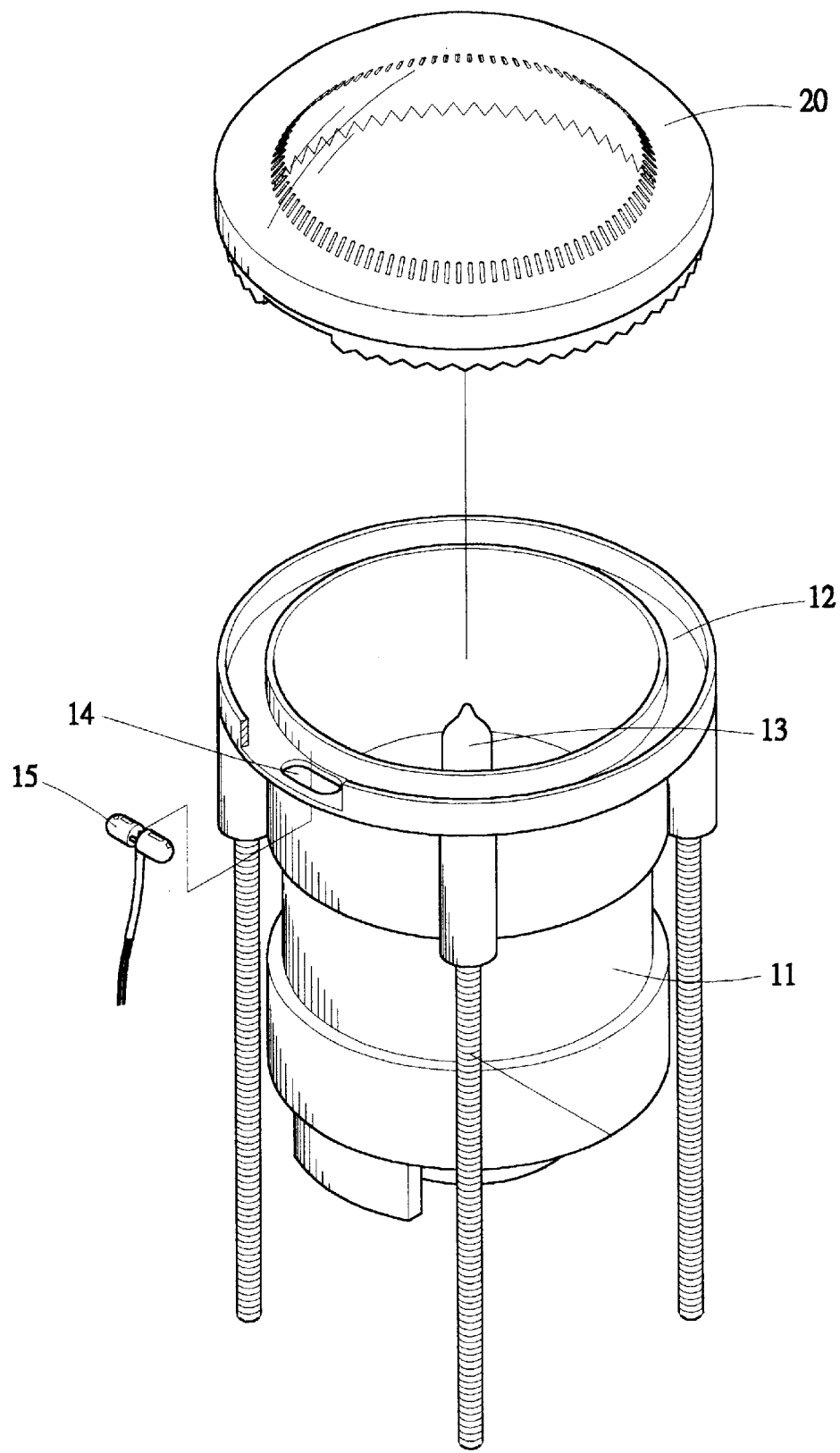
FIG. 2 is an exploded view of the lighting device of the present invention.

With reference to the drawings and in particular to FIGS. 1 and 2, a lighting device constructed in accordance with the present invention, generally designated with reference numeral 10, comprises a cylindrical base 11 defining a cavity (not labeled) having a closed bottom and an open top. A primary lighting element, such as a conventional automobile light bulb 13, is fixed on the closed bottom of the base 11. A cover 20, made of light-transmitting materials, is removably attached to the open top of the base 11 for closing the top opening of the base 11.

A circumferential groove 12 is defined in the top side of the base 11 and surrounding the top opening of the base 11. The cover 20 comprises a circumferential flange 22 having a wavy-like, corrugated configuration received in the groove 12 for attaching the cover 20 to the top side of the base 11.

The primary lighting element 13 is arranged inside the cavity of the base 11 and fixed on the bottom of the cavity, preferably at a center position. The bottom of the cavity is preferably a concave arc configuration or having a similar structure for projecting the light beam generated by the primary lighting element 13 toward and through the cover 20.

The groove 12 of the base 11 has a bottom wall (not labeled) in which a hole 14 is formed. An example of the secondary lighting element 15 is a light emitting diode (LED), preferably a color LED.

Figure 3:
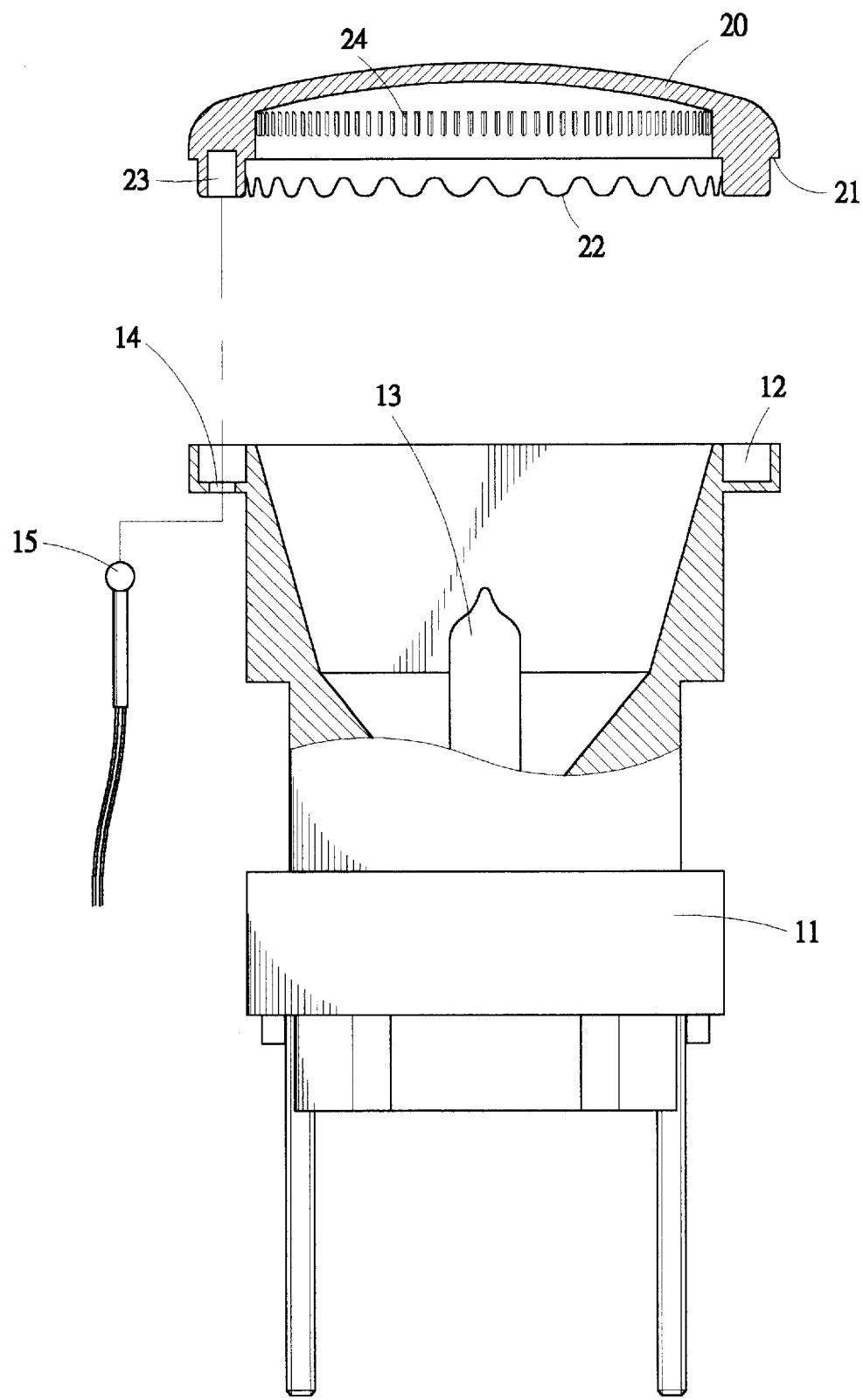
FIG. 3 is a cross-sectional view of FIG. 2.

Further referring to FIG. 3, the cover 20 is made of a light transmitting material. The cover 20 has a circumferential shoulder 21 defined by the flange 22 for positioning on the top side of the base 11 to support the cover 20 on the base 11. A recess 23 is defined in the flange 22 of the cover 20 for receiving the secondary lighting element 15 therein. A plurality of tooth-like projections 24 is formed on an inside surface of the cover 20 and substantially equally spaced along an inner circumference of the cover 20. The projections 24 are adjacent the shoulder 21 and the secondary lighting element 15.

The cover 20 is mounted to the base 11 by having the corrugated flange 22 fit into the groove 12 with the recess 23 substantially aligned with the hole 14 of the base 11. The secondary lighting element 15 is positioned into the recess 23 of the cover 20 through the hole 14 of the base 11 and is located close to the tooth-like projections 24 of the cover 20. Light emitted from the secondary lighting element 15 is conducted along and through the flange 22 toward the projections 24. The projections 24 are arranged to reflect and project the light outward to form a ring of lighting surrounding the light beam projecting from the primary lighting element 13 for enhancing the lighting effect of the primary lighting element 13 and also provides effect of alarming, decoration and identification.

Filler, such as silicone-based filler, is stuffed into the groove 12 for filling between sidewalls of the groove 12 and the flange 22 of the cover 20 so as to secure the cover 20 to the base 11. The corrugation configuration of the flange 22 provides an increased contact surface area for the filler for more securely fixing the cover 20 on the base 11.

Apparently, the filler can be replaced by fasteners of suitable types, such as bolts and nuts, for securing the cover 20 to the base 11.

The lighting device 10 can be employed in an automobile as a headlight or a brake light, as well as a turn signal light and a side-marker lamp. The lighting device 10 can also be used as an additional lighting device mounted on an automobile, such as a rescue light or an emergency lighting.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A lighting device comprising:
    a hollow base defining an interior space and having an open end;
    a light-transmitting cover comprising a flange attached to the open end of the base for covering the open end, a recess being defined in the flange, a plurality of projections being formed on an inside surface of the cover and spaced along an inner circumference of the cover;
    a primary lighting element fixed in the interior space of the base for projecting a light beam through the cover; and
    a secondary lighting element received in the recess of the cover whereby light emitted from the secondary lighting element is guided to the projections and projected outward therefrom to form a ring of lighting around the primary lighting element.

2. The lighting device as claimed in claim 1, wherein a circumferential groove is defined in and surrounds the open end of the base for receiving the flange of the cover therein, a hole being defined in the groove and substantially aligned with the recess of the cover for extension of the secondary lighting element therethrough.

3. The lighting device as claimed in claim 1, wherein the flange of the cover comprises a corrugated configuration.

4. The lighting device as claimed in claim 2, wherein the flange of the cover comprises a corrugated configuration received in the groove.

5. The lighting device as claimed in claim 1, wherein the secondary lighting element comprises a light emitting diode.

6. The lighting device as claimed in claim 5, wherein the secondary lighting element comprises a color light emitting diode.

* * * * *